(No Model.)
E. R. KNOWLES.
APPLICATION OF SECONDARY BATTERIES TO ELECTRIC LIGHTING.
No. 353,142. Patented Nov. 23, 1886.
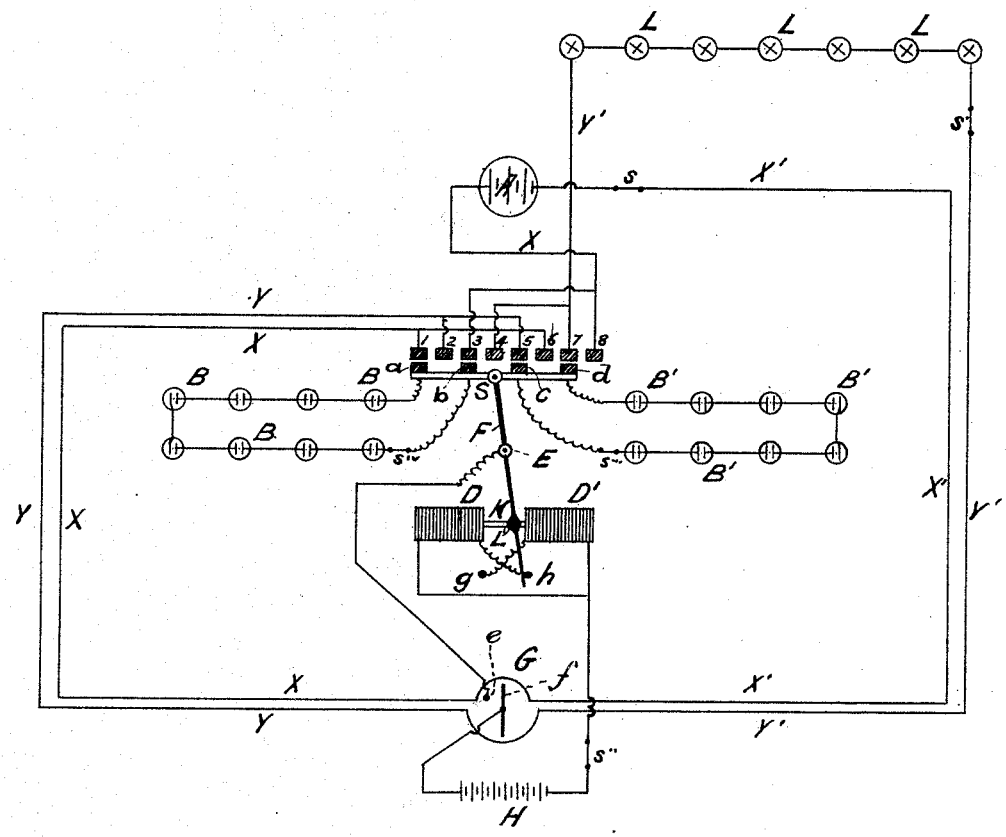
WITNESSES.
INVENTOR.
Edward R. Knowles.

UNITED STATES PATENT OFFICE.

EDWARD R. KNOWLES, OF BROOKLYN, NEW YORK.

APPLICATION OF SECONDARY BATTERIES TO ELECTRIC LIGHTING.

SPECIFICATION forming part of Letters Patent No. 353,142, dated November 23, 1886.

Application filed May 18, 1882. Renewed October 28, 1886. Serial No. 217,485. (No model.)

*To all whom it may concern:*

Be it known that I, EDWARD R. KNOWLES, a citizen of the United States, residing in Brooklyn, in the county of Kings and State of New York have invented a certain new and useful Combination of Apparatus and Circuits Adapted to the Practical Application and Use of Electricity, of which the following is a description in such full, clear, concise, and exact terms as will enable any one skilled in the art to which my invention belongs to make and use the same, reference being had to the accompanying drawing, making part of this specification, and to the letters and figures of reference marked thereon.

The object of my present invention is to provide a convenient, economical, and automatic means for alternately charging and discharging two sets of storage-batteries included in circuit with generator and lamps, for the purpose of continuously illuminating said lamps or operating any other known electro-translating device.

In the drawing, A is a generator of electricity; L, a lamp or other electro-translating device; B, a storage-battery, and B' another similar battery. 1, 2, 3, 4, 5, 6, 7, and 8 are stationary contact-points, and $a$, $b$, $c$, and $d$ are contact-points upon a movable switch-piece, S. E is a fulcrum, upon which a lever, F, is pivoted, one end of which is connected to the switch-piece S, the other end at L' being connected with the movable core K of the solenoids D and D', the end of the lever F extending beyond the core K, and arranged to make alternate contact with the terminal wires $g$ and $h$ of the two solenoids D' and D.

A simple form of terminals is illustrated in the drawing, but these may of course be variously constructed, if desirable. A differential galvanometer is represented by G, interposed in the circuits X and X' and Y and Y', and a local battery in electrical connection with the galvanometer and the electro-magnets is shown at H.

The operation of the device is as follows: Assuming the generator to be charging the battery B and the battery B' to be at work illuminating the lamps or operating other electro-translating device or devices, one circuit is from the generator A, through conductor X', galvanometer G, conductor X, contact-points 1 and $a$, battery B, contact-points $b$ and 3, conductor X, back to generator A. The other circuit is from battery B', through conductor Y', lamp L, conductor Y', galvanometer G, conductor Y, contact-points 5 and $c$, back to battery B'. Now, the circuit-wires X and X' and Y and Y' being wound on the galvanometer in opposite directions, the two circuits will so nearly balance each other that they will keep the needle $f$ of the galvanometer away from the stop $e$. Neither of the solenoids will in this case be energized, and the lever F and switch-piece S will remain at rest; but as the battery B' continues to exhaust itself through the lamps L the current from it through the galvanometer becomes weaker and weaker, and as the current from the generator A continues to charge the battery B the current flowing in that circuit and through the galvanometer also becomes weaker and weaker as the battery becomes more fully charged, until at last the electro-motive force of the battery B will neutralize the electro-motive force of the generator A. When this takes place, the conductors being disposed in the galvanometer, as hereinbefore described, the needle $f$ will make contact with the stop $e$, for the current from the battery to the lamps, although weak, will be still flowing, and the current from the generator to the other battery will be *nil*, and the equilibrium in the galvanometer will be destroyed and the needle will be brought into contact with the stop, as aforesaid. When, however, this occurs, the electro-motive forces in the two circuits have become so far unequal as to make it desirable to change the circuits in order that the battery which has been accumulating electric energy from the generator may be set at work running the lamps and the battery which has been illuminating the lamps may be recharged. The needle $f$ then makes contact with the stop $e$ and closes the circuit from the battery H through needle $f$, contact-stop $e$, lever F, terminal wire $h$, solenoid D, and conductor, back to battery H. Thus the solenoid D is energized and draws in its core K, to which the lever F is pivoted, until the end of said lever comes into contact with the terminal $g$, at the same time shifting the switch-piece S, and thereby changing the circuits, as aforesaid, the generator then charging the battery B', and the battery B then illuminating the lamps, as will be readily understood by reference to the drawing. When the battery B has in its turn become exhausted, the same action is repeated, the solenoid D' being energized in this instance, drawing the lever F into contact with stop $h$ and shifting the switch-piece S back to the position illustrated in the drawing.

Instead of the solenoids D D' and magnet-core K, two ordinary electro-magnets and an armature may of course be employed. The momentary impulse imparted to the said core or armature, as above described, will be sufficient to cause the lever F to come in contact with the opposite terminal, $g$ or $h$.

I do not intend to limit my invention to the precise device or combination of devices herein described and illustrated, for others with practically the same functions may obviously be used in their stead; but I intend to embrace within my invention any and all devices and combinations of devices which will accomplish the same results in a manner substantially similar to that described.

It will of course be understood that by the word "lamp," as used in the claims, I intend to include any known electro-translating device that may take the place of the lamp in the combination.

I therefore claim—

1. In a system of storing and applying electric energy, the combination of a generator of electricity, A, two storage-batteries, B and B', one or more electric lamps, L, and a switch-piece, S, in connection with and common to both storage-batteries, and operated automatically by the currents flowing in said system, one of said storage-batteries being in circuit with the generator at the same time the other is in circuit with the lamps, the automatic switch being interposed to change the circuit from the generator to one storage-battery, and at the same time from the other storage-battery to the lamps.

2. In a system of storing and applying electric energy, a generator of electricity, A, two storage-batteries, B and B', one or more electric lamps, L, and a switch-piece, S, in connection with and common to both storage-batteries, in combination with a local battery, and an automatic switch-changer in connection with the circuits of the generator, battery, and lamps, for the purpose of operating the switch automatically, substantially as described.

3. In a system of storing and applying electric energy, the combination, with a generator of electricity, A, two storage-batteries, B and B', one or more electric lamps, L, electrically connected, as described, of a switch-piece, S, and a differential galvanometer, G, interposed between the circuit from the generator to one storage-battery, and the circuit from the other storage-battery to the lamps, for the purpose substantially as described.

4. In a system of storing and applying electric energy, the combination of a switch-piece, S, pivoted lever F, movable magnet-core K, to which the lever is attached, two solenoids, D and D', contact-terminals $g$ $h$, differential galvanometer G, and battery H, electrically connected, as described, the local circuit being closed through the galvanometer-needle, as described, and the said galvanometer being interposed between the circuit from the generator to one storage-battery and the circuit from the other storage-battery to the lamps, for the purpose specified.

5. The combination, with an electrical generator and electric lamps, of two intermediate secondary batteries, a commutator throwing such batteries alternately in connection with the generator and lamps, and mechanism operated by the current for working such commutator, substantially as described.

EDWARD R. KNOWLES.

Witnesses:
J. EDGAR BULL,
AMOS BROADNAX.